Feb. 21, 1956
D. MESSENGER ET AL
2,735,730
VEHICLE TRACK SHOE ASSEMBLY
Filed May 18, 1954
2 Sheets-Sheet 1
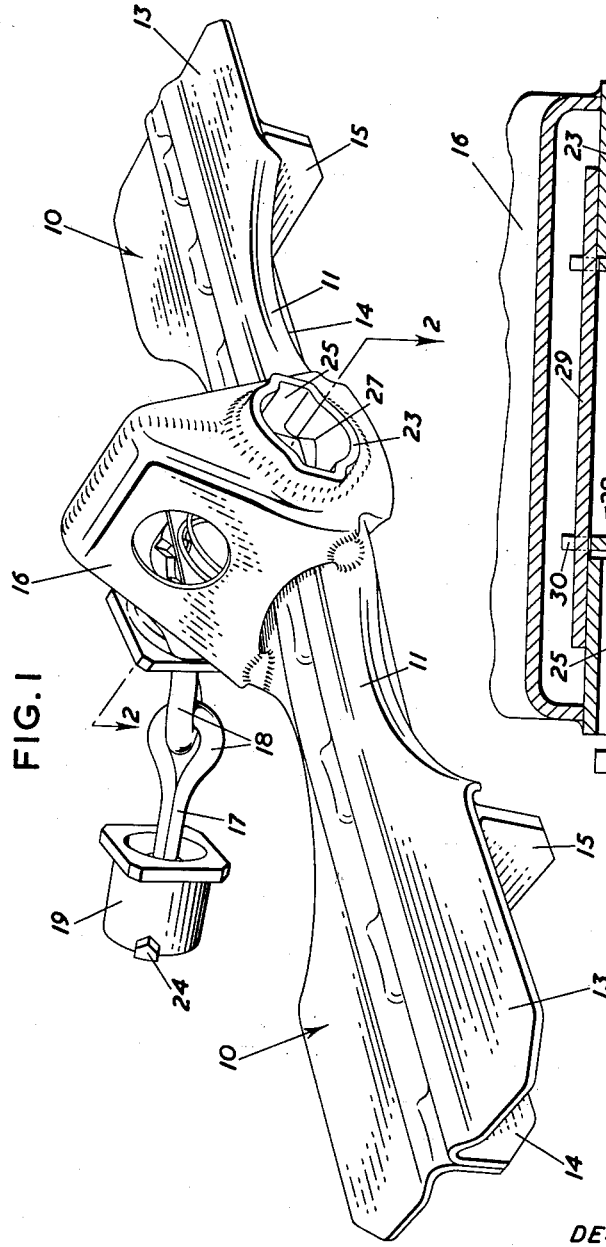
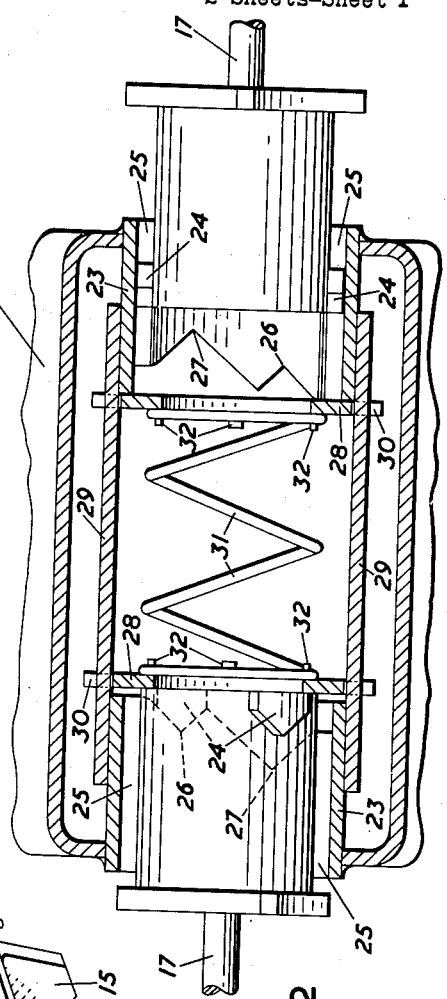
Inventors
DESMOND MESSENGER
STEWART WHITHARD
GLEN W. PHELPS
By~ Fetherstonhaugh & Co.
Attys Inventors
DESMOND MESSENGER
STEWART WHITHARD
GLEN W. PHELPS By~ Fetherstonhaugh&Co.
Attys

United States Patent Office 2,735,730
Patented Feb. 21, 1956

2,735,730

VEHICLE TRACK SHOE ASSEMBLY

Desmond Messenger, Stewart Whithard, and Glen W. Phelps, Orillia, Ontario, Canada, assignors to The Track Corporation Limited, Orillia, Ontario, Canada Application May 18, 1954, Serial No. 430,572

8 Claims. (Cl. 305—10)

This invention relates to improvements in endless tracks for application to the tires of tandem pneumatic vehicle road wheels, and the object of the invention is to provide a track which may be readily mounted upon and de-mounted from vehicle road wheels as the occasion demands; the track comprising a plurality of tread shoes linked together by flexible couplings which are detachably connected to the shoes and also designed for ready adjustment in length whereby any desired track tension upon the vehicle wheels may be readily attained.

Another object of the invention is to form the housings with inwardly extending sockets in their sides which are parallel to the sides of the shoes, plugs being secured to the free ends of the couplings and receivable within the sockets; the plugs carrying lugs which are designed to be seated within notches in the socket structure and which are so arranged that various locked positions of the plugs within the sockets may be obtained to produce adjustment of the lengths of the couplings.

With the foregoing and other objects in view, as shall appear, our invention consists of an endless track constructed and arranged as hereinafter more fully described and illustrated in the accompanying drawings, in which:

Figure 1 is a perspective view of one of the track shoes and showing a coupling extending from one side thereof and removed from the other side thereof.

Figure 2 is an enlarged cross-sectional view through a shoe coupling end receiving housing, being taken through the line 2—2, Figure 1.

Like characters of reference indicate corresponding parts in the different views in the drawings.

Figure 5:
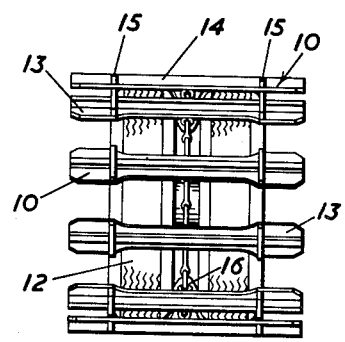
Figure 5 is an end view of the assembly shown in Figure 4.

The shoe plates 10 are of sufficient length to extend beyond the tread path of the pair of dual wheels to which they are designed to be applied, as shown in Figure 5. The portions 11 of the shoe plates upon which the tires 12 of the wheels rest are narrower than the outer portion 13 of the plates. Longitudinal and transverse traction lugs 14 and 15 are mounted upon the under faces of the shoe plates, and the portions 11 of the shoe plates are of convex cross-sectional form to give added strength against buckling under the weight of the vehicle road wheels resting thereon.

Each of the shoe plates carries a centrally positioned coupling end receiving housing 16 upon its wheel engaging face, the housing being of wedge-shape and adapted to be seated between the side walls of the tires 12 of adjacent dual wheels, whereby the track is retained in position.

Figure 3:
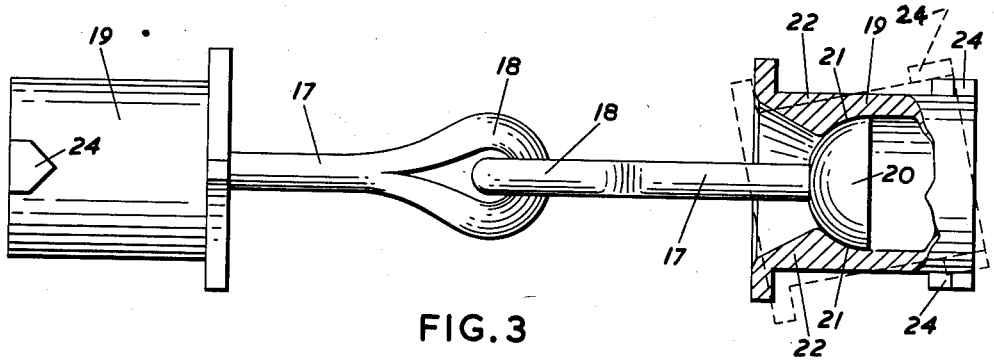
Figure 3 is a plan view of a detached shoe coupling unit, one of the end plugs thereof being shown in section.
Figure 4:
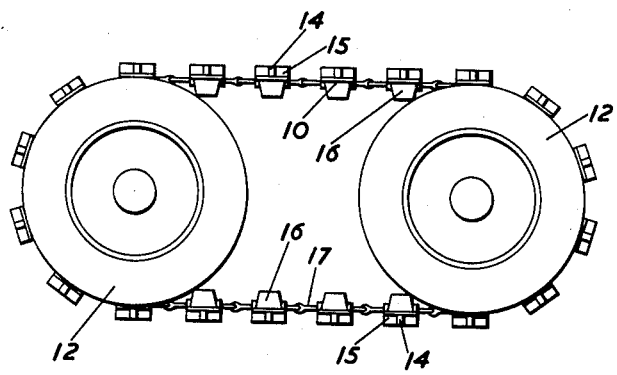
Figure 4 is a side elevational view of a pair of dual tandem pneumatic vehicle road wheels; and showing the endless track applied thereto.

Each coupling unit, as illustrated in Figure 3, comprises a pair of similar shanks 17 having interengaging eyes 18. The ends of the shanks are anchored within hollow cylindrical plugs 19 by ball and socket type universal joints consisting of circular convex caps 20 which are seated against the curved faces 21 of collar portions 22 formed within the bores of the plugs 19, the caps 20 being freely swingable upon the faces 21 as illustrated in dotted lines in Figure 3.

Each housing contains a pair of inwardly extending plug receiving sockets 23 in its side walls, the sockets being of tubular form and of slightly greater diameter than the diameter of the plugs 19 whereby the plugs may be readily slid into the sockets. To secure the plugs within the sockets each plug carries a pair of lugs 24 which are diametrically positioned opposite one another to protrude from the side of the plug. Each socket is formed with a pair of grooves 25 which are diametrically positioned to receive the lugs 24 when the plugs are inserted within the sockets, the lugs freely sliding within the grooves.

To anchor the plugs within the sockets, the inner end of each socket is formed with notches which receive the lugs 24 after a plug has been fully inserted and then twisted to swing the lugs out of the inner ends of the grooves to rest against the inner face of the socket. Upon reference to Figure 2, it will be seen that the inner end of each socket is formed with two pairs of notches 26 and 27. The notches 26 are positioned diametrically opposite one another, as are the notches 27, whereby the pair of lugs 24 will enter either the pair of notches 26 or the pair of notches 27. The notches 27 are deeper than the notches 26 whereby engagement of the lugs 24 in the notches 26 will retain the plug in its innermost position and engagement of the lugs 24 in the notches 27 will retain the plug in an outer position. By this arragement each end of each coupling unit has two length adjustments in its attachment to its shoe.

To retain the lugs 24 against accidental displacement from being properly seated within the notches, a pair of buffer plates 28 are slidably mounted upon a pair of guides 29 which are diametrically positioned opposite one another and extend between the sockets, the buffer plates being formed with guide slots 30 slidable upon the guides 29. A spiral compression spring 31 is interposed between the pair of buffer plates to urge them apart, the spring being held in position by clips 32 protruding from the inner faces of the plates.

The buffer plates press against the inner faces of the inserted plugs 19 and thus resiliently retain the lugs 24 in engagement within the notches in the inner ends of the sockets. As will be understood upon reference to Figure 2, the notched inner faces of the sockets intersect the inner ends of the grooves 25, whereby the lugs 24 upon manual twisting of the plugs, will swing out of the grooves and rest against the notched inner faces of the sockets, being pressed thereagainst by a buffer plate 28 under the tension of the spring 31.

To loosen a coupling, it is only necessary to manually rotate one of the coupling plugs until its lugs are seated within the socket grooves 25 when the plug may be readily withdrawn. In mounting the track upon a pair of tandem dual wheels, one of the track couplings is disconnected and the track laid in a straight line upon the ground. The tandem dual wheels of the vehicle are then positioned upon the track and the track wrapped therearound, the plug of the free end of the disconnected coupling being inserted into the socket in the face of the housing of the adjacent shoe. It will, of course, be understood that the track will be of approximately the required length to surround the pairs of wheels, the track tension being adjusted by twisting one or more of the coupling plugs 19 to either lengthen or shorten the couplings, as required.

Figure 6:
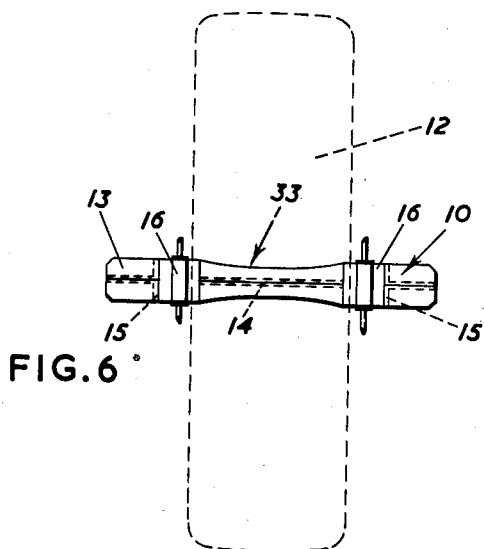
Figure 6 is a plan view of a shoe construction designed for application to tandem single road wheels.

Figure 6 shows a track shoe 33 designed for use with tandem single road wheels and is of substantially the same construction as the shoe 10. The shoe carries two coupling end receiving housings 16 between which the tires of the tandem single wheels are seated, as shown in dotted lines, the track being formed by shoes connected together by two sets of couplings.

Although a particular arrangement and construction of the caterpillar track has been shown and described, it will be understood that changes and alterations may be made apart from the basic invention without departing from the spirit thereof as set forth in the appended claims.

What we claim as our invention is:

1. An endless track for application to the tires of tandem pneumatic vehicle road wheels and comprising a plurality of track shoes, housings mounted upon the wheel engaging faces of the shoes, shoe couplings extending between the housings, sockets extending inwardly from the opposite sides of the housings, plugs secured to the free ends of the couplings and receivable within the sockets, and lugs protruding from the plugs to engage the sockets and anchor the plugs within the sockets.

2. An endless track for application to the tires of tandem pneumatic vehicle road wheels and comprising a plurality of track shoes, housings mounted upon the wheel engaging faces of the shoes, shoe couplings extending between the housings, sockets extending inwardly from the opposite sides of the housings, plugs manually slidable into and twistable within the sockets, universal joints connecting the coupling ends to the plugs, and lugs protruding from the ends of the plugs to engage the inner ends of the sockets and anchor the plugs within the sockets.

3. An endless track for application to the tires of tandem pneumatic vehicle road wheels and comprising a plurality of track shoes, housings mounted upon the wheel engaging faces of the shoes, shoe couplings extending between the housings, sockets extending inwardly from the opposite sides of the housings, plugs manually slidable into and twistable within the sockets, universal joints connecting the coupling ends to the plugs, inwardly extending grooves in the socket walls, and lugs protruding from the sides of the plugs and slidable within the grooves to engage notches at the inner ends of the sockets to anchor the plugs within the sockets.

4. An endless track as defined in claim 3, wherein the sockets are each formed with several of the lug receiving notches which are so arranged in relation to each other that the lugs are successively received thereinto upon twisting motion of the plugs within the sockets.

5. An endless track as defined in claim 3, wherein the inner ends of the sockets are each formed with several of the lug receiving notches, each notch being a different distance from the front end of its socket, the lugs being successively received into the notches upon twisting and sliding motion of the plug within the socket.

6. An endless track as defined in claim 3, wherein buffer plates are slidably mounted within the housings and against which the inner ends of the plugs bear, and springs contained within the housings and urging the buffer plates towards the plugs.

7. An endless track as defined in claim 3, wherein buffer plates are slidably mounted within the housings and against which the inner ends of the plugs bear, and springs contained within the housings and urging the buffer plates towards the plugs, the inner ends of the sockets being each formed with several of the lug receiving notches, each notch being a different distance from the front end of its socket, the lugs being successively received into the notches upon twisting and sliding motion of the plug within the socket.

8. In an endless track shoe and a coupling shank attached thereto by a universal joint and extending from the side of the shoe, of means for altering the length of the portion of the coupling extending from the shoe and comprising a socket member mounted upon the shoe, a plug manually slidable into and twistable within the socket, and from which the coupling shank extends, an inwardly extending groove in the socket wall, a lug on the plug and slidable within the groove, several lug receiving notches formed in the edge of the inner end of the socket and into which the lug may enter from the inner end of the groove, each notch being a different distance from the side of the shoe, the plug being anchored within the socket through the engagement of its lug with one of the notches, and means for resiliently urging the lug into a notch.

References Cited in the file of this patent

UNITED STATES PATENTS

| | | |
|---|---|---|
| 1,873,312 | Douglas | Aug. 23, 1932 |
| 2,157,153 | Troche | May 9, 1939 |
| 2,455,307 | Irvin | Nov. 30, 1948 |